United States Patent
Innes et al.

(10) Patent No.: US 10,579,420 B2
(45) Date of Patent: Mar. 3, 2020

(54) APPARATUS, SYSTEM AND METHOD FOR PROXY COUPLING MANAGEMENT

(71) Applicant: Proximal Systems Corporation, Holladay, UT (US)

(72) Inventors: Anthony D. Innes, Alicante (ES); Ronald N. Hilton, Holladay, UT (US)

(73) Assignee: PROXIMAL SYSTEMS CORPORATION, Holladay, UT (US)

( * ) Notice: Subject to any disclaimer, the term of this patent is extended or adjusted under 35 U.S.C. 154(b) by 218 days.

(21) Appl. No.: 15/647,602

(22) Filed: Jul. 12, 2017

(65) Prior Publication Data

US 2018/0018199 A1 Jan. 18, 2018

Related U.S. Application Data

(60) Provisional application No. 62/361,487, filed on Jul. 12, 2016.

(51) Int. Cl.
| | |
|---|---|
| *G06F 11/00* | (2006.01) |
| *G06F 9/48* | (2006.01) |
| *G06F 9/50* | (2006.01) |
| *G06F 11/20* | (2006.01) |

(52) U.S. Cl.
CPC .......... *G06F 9/4856* (2013.01); *G06F 9/4862* (2013.01); *G06F 9/5027* (2013.01); *G06F 11/203* (2013.01); *G06F 11/2025* (2013.01); *G06F 11/2038* (2013.01); *G06F 11/2048* (2013.01); *G06F 2201/805* (2013.01); *G06F 2209/507* (2013.01); *G06F 2209/508* (2013.01); *G06F 2209/509* (2013.01)

(58) Field of Classification Search
CPC .... G06F 9/4856; G06F 9/4862; G06F 9/4806; G06F 9/5061
See application file for complete search history.

(56) References Cited

U.S. PATENT DOCUMENTS

| | | | | |
|---|---|---|---|---|
| 8,526,885 | B2 * | 9/2013 | Lin | H04M 1/7253 455/41.3 |
| 8,527,991 | B2 * | 9/2013 | Hilton | G06F 9/5044 718/100 |
| 8,832,174 | B2 * | 9/2014 | Shin | G06F 9/4856 709/201 |
| 9,098,439 | B2 * | 8/2015 | Chiu | G06F 12/16 |
| 9,183,378 | B2 * | 11/2015 | Banerjee | G06F 21/52 |

(Continued)

OTHER PUBLICATIONS

PCT/2017/041664, Notification of Transmittal of the International Search Report and the Written Opinion of the International Searching Authority, or the Declaration, dated Sep. 21, 2017, pp. 1-23.

*Primary Examiner* — Marc Duncan
*Assistant Examiner* — Jonathan D Gibson
(74) *Attorney, Agent, or Firm* — Kunzler Bean & Adamson

(57) ABSTRACT

An apparatus, system, and method are disclosed for proxy coupling management. A proxy template module transparently offloads a task from a native data processing system to an equivalent task on a remote data processing system. A proxy generation module fills in the proxy template with information, such as specification of an offload task that is a remote equivalent of the native task, to generate a proxy of the native task. An offload agent module receives a request from the proxy to perform the offload task on the remote data processing system.

20 Claims, 11 Drawing Sheets

(56) References Cited

U.S. PATENT DOCUMENTS

| | | | |
|---|---|---|---|
| 9,507,630 B2* | 11/2016 | Addepalli | G06F 9/461 |
| 10,061,620 B2* | 8/2018 | Gandhi | G06F 9/5061 |
| 2005/0076327 A1* | 4/2005 | Helal | G06F 8/20 |
| | | | 717/100 |
| 2006/0009213 A1 | 1/2006 | Sturniolo et al. | |
| 2006/0242330 A1* | 10/2006 | Torudbakken | G06F 13/4004 |
| | | | 710/5 |
| 2007/0168711 A1* | 7/2007 | Chen | G06F 11/2025 |
| | | | 714/11 |
| 2008/0196029 A1* | 8/2008 | Doty | G06F 9/466 |
| | | | 718/101 |
| 2009/0070591 A1 | 3/2009 | Keohane et al. | |
| 2009/0089794 A1* | 4/2009 | Hilton | G06F 9/5044 |
| | | | 718/105 |
| 2009/0187912 A1* | 7/2009 | Lee | G06F 9/4856 |
| | | | 718/103 |
| 2010/0022231 A1* | 1/2010 | Heins | H04M 3/4872 |
| | | | 455/418 |
| 2010/0287560 A1* | 11/2010 | Neft | G06F 9/4856 |
| | | | 718/104 |
| 2011/0113131 A1 | 5/2011 | Duanmu et al. | |
| 2011/0173633 A1* | 7/2011 | Shin | G06F 9/4856 |
| | | | 718/108 |
| 2011/0246992 A1* | 10/2011 | Kern | G06F 9/5072 |
| | | | 718/100 |
| 2012/0096076 A1* | 4/2012 | Chan | G06F 9/4856 |
| | | | 709/203 |
| 2012/0131137 A1* | 5/2012 | Singh | H04L 67/2861 |
| | | | 709/217 |
| 2012/0250858 A1* | 10/2012 | Iqbal | H04L 9/0861 |
| | | | 380/44 |
| 2013/0041790 A1* | 2/2013 | Murugesan | G06F 9/4856 |
| | | | 705/30 |
| 2013/0109371 A1* | 5/2013 | Brogan | G06F 1/1626 |
| | | | 455/420 |
| 2013/0124675 A1* | 5/2013 | Mo | G06F 9/461 |
| | | | 709/217 |
| 2013/0179729 A1* | 7/2013 | Chiu | G06F 12/16 |
| | | | 714/19 |
| 2013/0212212 A1* | 8/2013 | Addepalli | G06F 9/461 |
| | | | 709/217 |
| 2013/0254258 A1* | 9/2013 | Agarwalla | H04L 29/06 |
| | | | 709/202 |
| 2013/0339979 A1* | 12/2013 | Hilton | G06F 9/5044 |
| | | | 718/105 |
| 2014/0007121 A1* | 1/2014 | Caufield | G06F 9/4843 |
| | | | 718/103 |
| 2014/0282596 A1* | 9/2014 | Bourbonnais | G06F 9/46 |
| | | | 718/105 |
| 2014/0344527 A1* | 11/2014 | Kaku | G06F 9/461 |
| | | | 711/147 |
| 2015/0261274 A1* | 9/2015 | Ahnn | G06F 9/54 |
| | | | 713/340 |
| 2015/0261567 A1* | 9/2015 | Kim | G06F 9/5027 |
| | | | 718/104 |
| 2015/0347184 A1* | 12/2015 | Kim | G06F 9/4856 |
| | | | 718/104 |
| 2016/0316314 A1* | 10/2016 | Swaminathan | H04L 67/26 |
| 2017/0177840 A1* | 6/2017 | Srivastava | H04L 63/20 |
| 2017/0242602 A1* | 8/2017 | Demchenko | G06F 9/4856 |
| 2017/0286140 A1* | 10/2017 | Lowry | G06F 9/548 |

* cited by examiner

APPARATUS, SYSTEM AND METHOD FOR PROXY COUPLING MANAGEMENT

CROSS-REFERENCE TO RELATED APPLICATIONS

This application claims the benefit of U.S. Provisional Patent Application No. 62/361,487 entitled "APPARATUS, SYSTEM, AND METHOD FOR PROXY COUPLING MANAGEMENT" and filed on Jul. 12, 2016 for Anthony D. Innes and Ronald N. Hilton, which is incorporated herein by reference.

BACKGROUND

Field

The subject matter disclosed herein relates to cross-system coupling and more particularly relates to the offloading of computing tasks from one data processor or processing system to another data processor or processing system.

Description of the Related Art

As is known in the art, special-purpose offload processors are employed to perform certain computing tasks more efficiently than a general-purpose processor or processing system. Such processors have been implemented as a coprocessor attached to a general-purpose processor which augments the processing capabilities of the latter to perform specialized operations such as floating-point, vector or cryptographic processing. Alternatively, the offload processors may be implemented as peers of the general-purpose processors in a multi-processing system, with the ability to run specialized tasks concurrently with other tasks running on the general-purpose processors. An example of the latter would be the zAAP and zIIP processor types in a z/Architecture mainframe system, which run under the control of the z/OS operating system but are confined to certain types of tasks such as Java applets and database queries.

In a traditional offload processor design, the general-purpose and the offload processors all run within the same data processing system, as defined by the same overall architecture, and under the control of the same executive. Such a tightly-coupled design tends to minimize communication latency, but also limits flexibility and increases cost by failing to exploit the wide variety of computing systems with differing architectures and price points that are available in the marketplace today.

BRIEF SUMMARY

Based on the foregoing discussion, the inventors have recognized that a long-felt unmet need for an apparatus, system, and method that seamlessly offloads processing of computing tasks from one data processor or processing system to another data processor or processing system of a potentially different architecture. Beneficially, such an apparatus, system, and method would exhibit the flexibility and cost-effectiveness of cross-system coupling while achieving the transparency and high efficiency of tightly-coupled offload processors.

The embodiments of the present invention have been developed in response to the present state of the art, and in particular, in response to the problems and needs in the art hitherto proven intractable under currently available offload processors. Accordingly, the embodiments have been developed to provide a method, apparatus, and system for offloading processing from one data processing system to another data processing system of a potentially different architecture that overcome many or all of the above-discussed shortcomings in the art.

Each data processing system may include a software stack running on one or more processors, memory, I/O (Input/Output) device interfaces, and network interfaces, connected through a bus. The data processing systems may also consist of separate logical or physical partitions of a larger data processing system, with some or all of the aforementioned system components dedicated to a specific partition or shared between multiple partitions in a virtualized manner.

The task to be offloaded is hosted on a first data processing system, and extends its services to a second data processing system via a proxy which is hosted on the second system. The task and its proxy each relies upon its respective local host for basic operating system services such as dispatching processor resources, memory management, I/O device access, and facilities to communicate with the other system.

At the application level, the offload task has the primary responsibility for the internal functions of the application, and the proxy task has the primary responsibility for external communication with other related tasks on the second system. The offload task and its proxy communicate with each other in a manner specific to needs of the application, effectively operating as coroutines comprising a single logical task.

The more efficient the underlying facilities for inter-system communication, the more the efficiency of the over-all mechanism may approach that of the tightly-coupled offload mechanisms in the prior art, but without the added cost and inflexibility associated with such special-purpose mechanisms.

Note that the role of first and second data processing system is task-dependent. A system may serve as the offload system for one task while simultaneously serving as the proxy system for another task. This approach to offloading data processing between cross-coupled systems is termed proxy coupling, including an apparatus, system and method for managing it.

The apparatus to manage proxy coupling is provided with a plurality of modules configured to functionally execute the necessary steps of providing a proxy template to transparently offload a task from a native data processing system to an equivalent task on a remote data processing system, filling in the proxy template with information, such as specification of an offload task that is a remote equivalent of the native task, to generate a proxy of the native task, and receiving a request from the proxy to perform the offload task on the remote data processing system. These modules in the described embodiments include a proxy template module, a proxy generation module, and an offload agent module.

The proxy template module may also monitor the state of the offload agent, cancel the request to the offload agent, and initiate a failback to revert to the native task. The proxy generation module also may fill in additional information, such as specification of input and output data needed by the native task, or an alias of the native task to be invoked for purposes of automatic failback in the event of an error. The offload agent module may also enqueue an offload request from the proxy to a pending queue, move the request from the pending queue to an active queue and activate the corresponding offload task, and monitor the offload task on the active queue and dequeue it upon completion.

In one embodiment, the apparatus includes a proxy configuration module that incorporates the proxy and its corresponding offload task into a configuration management database (CMDB), enhances security and access control for proxy code and data, and adjusts control parameters of the proxy and initially activates the proxy. The apparatus also may include a proxy installation module that creates control parameters for the proxy and associates a native task alias with the proxy.

In a further embodiment, the apparatus includes a failback recovery module that reverts back to the native task if the proxy, offload agent module, or remote data processing system experiences an outage, adjusts native data processing system capacity, deactivates any affected proxy, and restores normal operation when the outage has been resolved.

A system is also presented to manage proxy coupling. The system may be embodied to include a first/remote and a second/native data processing system, a communication mechanism, the foregoing proxy coupling management apparatus, and a storage system to store input and output data. In particular, the system, in one embodiment, includes an operations automation module and a system monitoring module.

In one embodiment, the failback recovery module may inform the operations automation module when a failback occurs. In another embodiment, the offload agent module may inform the system monitoring module of requested measurement data.

A method is also presented for proxy coupling management. The method in the disclosed embodiments substantially includes the steps necessary to carry out the functions presented above with respect to the operation of the described apparatus and system.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
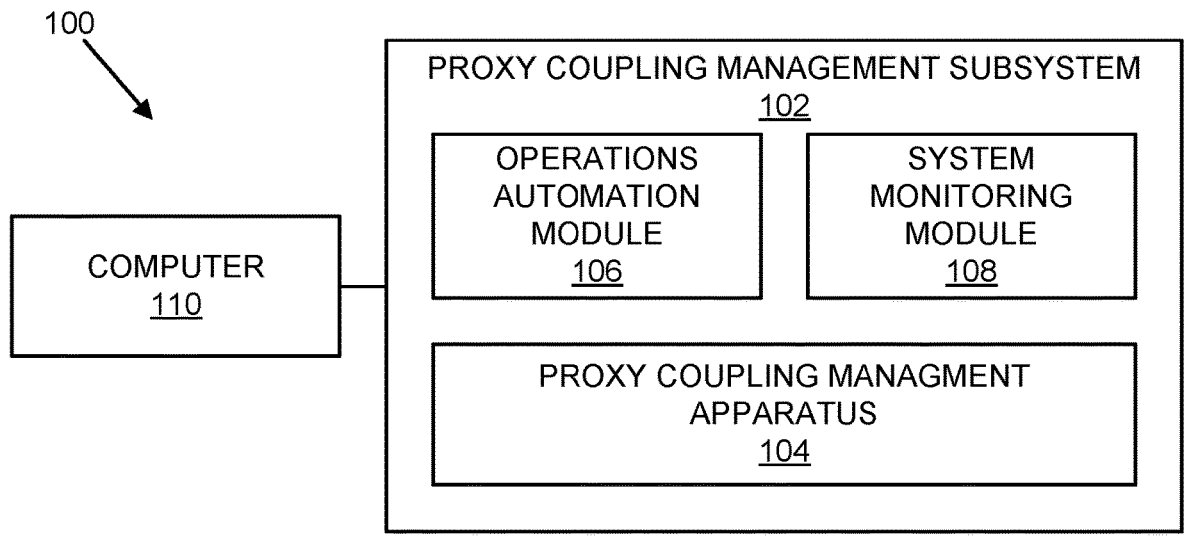
FIG. 1 is a schematic block diagram illustrating a system of the present invention.

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating a system 100 of a present embodiment, including a computer or information handling system 110 and a proxy coupling management subsystem 102. The subsystem 102 further includes a proxy coupling management apparatus 104, an operations automation module 106, and a system monitoring module 108. In an embodiment, the foregoing components of the subsystem 102 may be fully or partially implemented within a hardware platform and/or a software stack of the computer 110.

The apparatus 104 may provide a proxy template, fill in the proxy template with information to generate a proxy of the native task, and receive a request from the proxy to perform the offload task.

The operations automation module 106 may be informed when a failback occurs and assist with recovery. The system monitoring module 108 may be informed of requested measurement data. In one embodiment, a timestamp may be included.

Figure 2:
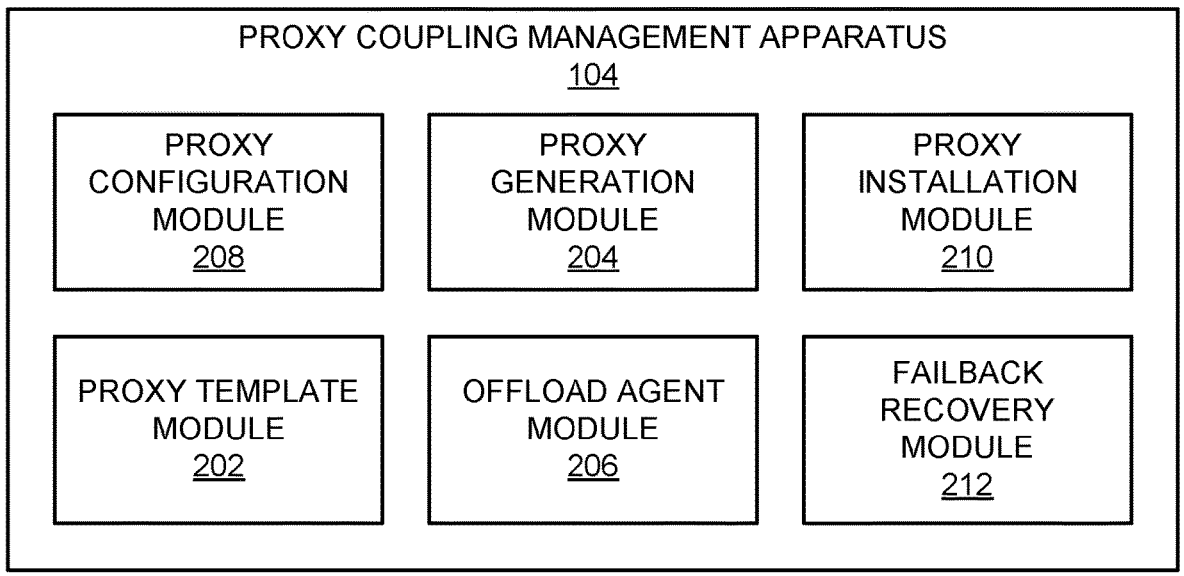
FIG. 2 is a schematic block diagram illustrating a proxy coupling management apparatus.

FIG. 2 is a schematic block diagram illustrating a proxy coupling management apparatus 104, including a proxy template module 202, a proxy generation module 204, an offload agent module 206, a proxy configuration module 208, a proxy installation module 210, and a failback recovery module 212. The proxy template module 202 may transparently offload a task from a native data processing system 500-2 to an equivalent task on a remote data processing system 500-1. The proxy generation module 204 may fill in the proxy template with information, such as specification of an offload task that is a remote equivalent of the native task, to generate a proxy of the native task. The offload agent module 206 may receive a request from the proxy to perform the offload task on the remote data processing system 500-1. The proxy configuration module 208 may incorporate the proxy and its corresponding offload task into a configuration management database (CMDB). The proxy installation module 210 may create control parameters for the proxy. The failback recovery module 212 may revert back to the native task if the proxy, offload agent module, or remote data processing system 500-1 experiences an outage.

The proxy template module 202 may further monitor the state of the offload agent. In various embodiments, the proxy template module 202 may also cancel the request to the offload agent. In a further embodiment, the proxy template module 202 may initiate a failback to revert to the native task.

The proxy generation module 204 may further fill in additional information, such as specification of input and output data needed by the native task, or an alias of the native task to be invoked for purposes of automatic failback in the event of an error. The offload agent module 206 may further enqueue an offload request from the proxy to a pending queue, move the request from the pending queue to an active queue and activate the corresponding offload task, and monitor the offload task on the active queue and dequeue it upon completion. The proxy configuration module 208 may further enhance security and access control for proxy code and data, and adjust control parameters of the proxy and initially activate the proxy. The proxy installation module 210 may further associate a native task alias with the proxy. The failback recovery module 212 may further adjust native data processing system 500-2 capacity, deactivate any affected proxy, and restore normal proxy coupling operation when the outage has been resolved.

Figure 3:
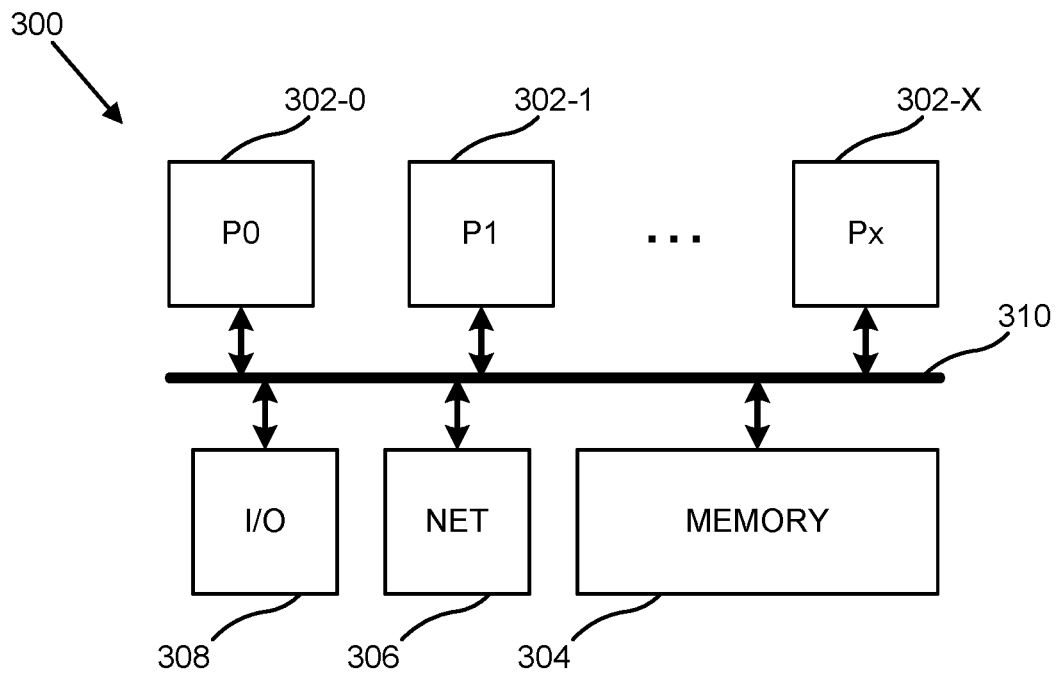
FIG. 3 is a schematic block diagram illustrating a possible computer hardware platform upon which the present invention may be at least in part deployed.

FIG. 3 illustrates a possible computer hardware platform 300 upon which the present invention may be at least in part deployed. The hardware platform 300 may include processor(s) 302, memory 304, a network interface 306, and an I/O (Input/Output) device interface 308, connected through a bus 310.

The hardware platform 300 may be of any form factor or type, including an embedded system, a handheld, a notebook, a personal computer, a minicomputer, a server, a mainframe, a supercomputer, and the like.

The processor(s) 302 may be present in any quantity, including a uniprocessor, and may have any instruction set architecture. In an embodiment, the processor(s) 302 may have one or more levels of dedicated or shared caches. Possible physical implementations may include multi-chip, single chip, multi-core, hyperthreaded processors, and the like.

The memory 304 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 306 may support any network protocol or architecture. It may support both wireless and hard-wired network connections. It may comprise Ethernet, Token Ring, System Network Architecture ("SNA"), and the like. In one embodiment, it may be integrated with the I/O device interface 308.

The I/O device interface 308 may be driven primarily by the processor(s) 302 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 310 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 310 may comprise a high-speed internal network.

Figure 4:
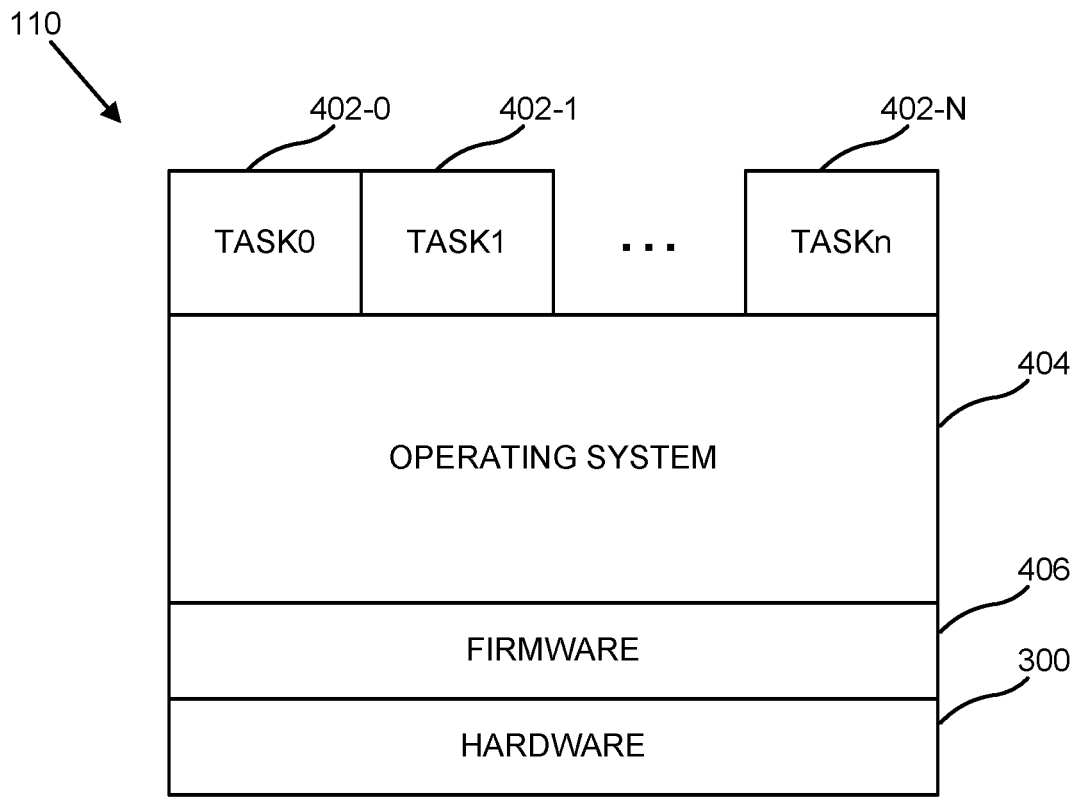
FIG. 4 is a schematic block diagram of a possible computer including a software stack in which the present invention may at least in part reside.

FIG. 4 is a diagram of a possible computer 110 including a software stack in which the present invention may at least in part reside. The software stack may include task(s) 402, hosted on an operating system 404, enabled by firmware 406, running on a hardware platform 300 of which the configuration of FIG. 3 is representative.

The task(s) 402 may include both user- and system-level tasks. They may be interactive or batch. They may run in the foreground or background. User-level task(s) 402 may include applications, programs, jobs, middleware, and the like. System-level task(s) 402 may include services, drivers, daemons, utilities, and the like.

The operating system 404 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 404 may be single-user or multi-user. It may be single-tasking or multi-tasking. In an embodiment, the operating system 404 may be real-time. In another embodiment, the operating system 404 may be embedded.

The firmware 406 may comprise microcode, which may reside in a microstore of the processor(s) 302. In an embodiment, the firmware 406 may comprise low-level software, which may reside in memory 304. In one embodiment, the firmware 406 may comprise a rudimentary operating system 404. In a further embodiment, the firmware 406 may support virtualization so as to permit the concurrent operation of multiple operating systems 404 on a hardware platform 300.

Figure 5:
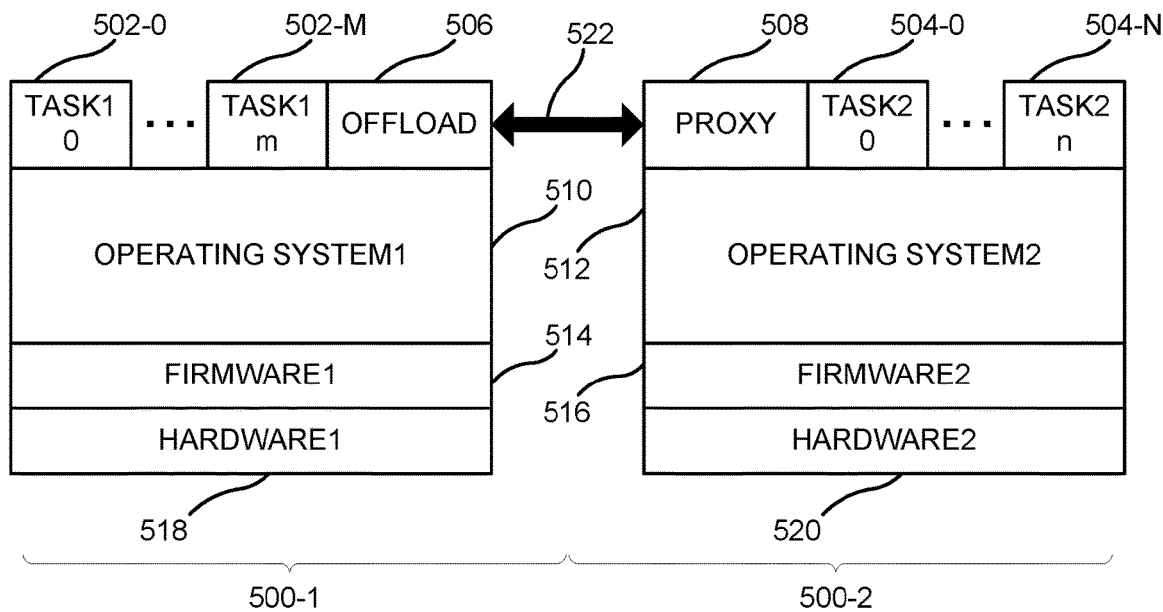
FIG. 5 is a schematic block diagram of two computers operating according to the present invention.

FIG. 5 is a schematic block diagram of two computers 500 including their respective software stacks operating according to the present invention. The first and second software stacks may respectively include first task(s) 502 and second task(s) 504 which may or may not differ as to number and function, hosted respectively on a first operating system 510 and on a potentially different second operating system 512, enabled respectively by first firmware 514 and by a potentially different second firmware 516, and running respectively on a first hardware platform 518 and on a potentially different second hardware platform 520. Said hardware platforms may also be logical or physical partitions of one or more larger hardware platforms.

Of particular relevance to the present invention are the offload task 506 and the proxy task 508. These tasks are hosted respectively on the first and second software stacks executing respectively on first and second hardware platforms 518 and 520, hereinafter referred to respectively as a first data processing system 500-1 and a second data processing system 500-2. The offload task 506 and its corresponding proxy task 508 each relies upon its respective local host, the first data processing system 500-1 and the second data processing system 500-2, for basic operating system services such as dispatching processor resources, memory management, I/O device access, and facilities to communicate with the other system.

The offload task 506 on the first data processing system 500-1 extends its services to the second data processing system 500-2 via the proxy task 508. At the application (or middleware or driver) level, the offload task 506 has the primary responsibility for the internal functions of the application, and the proxy task 508 has the primary responsibility for external communication with other related second tasks 504 on the second data processing system 500-2. The offload task 506 and its proxy task 508 communicate with each other via communication mechanism 522 in a manner specific to the needs of the application, effectively operating as coroutines comprising a single logical task.

Figure 6:
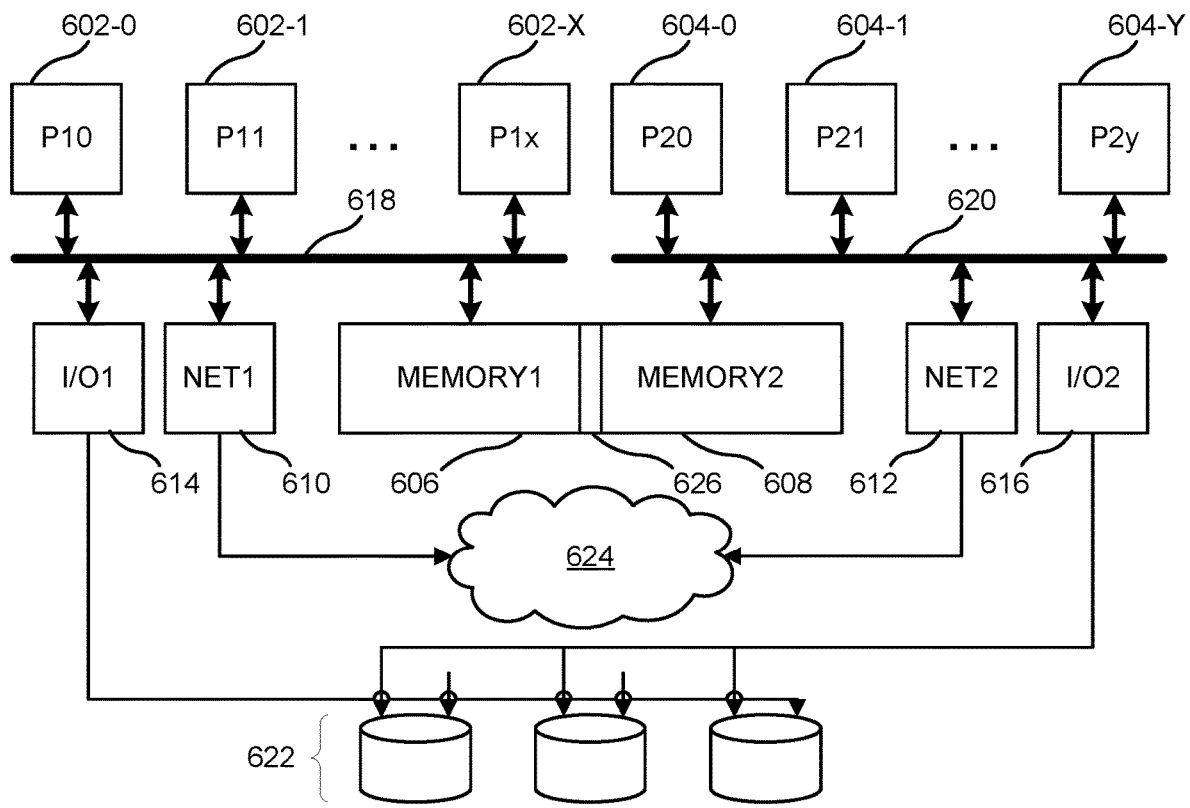
FIG. 6 is a schematic block diagram of a possible hardware configuration of multiple data processing systems in which the present invention may at least partially reside.

FIG. 6 is a schematic block diagram of a possible hardware configuration of multiple data processing systems in which the present invention may at least partially reside, illustrating several potential pathways for the communication mechanism 522 in FIG. 5. The first data processing system 500-1 and the second data processing system 500-2 may respectively include first processor(s) 602 and second processor(s) 604, first memory 606 and second memory 608, first network interface 610 and second network interface 612, first I/O device interface 614 and second I/O device interface 616, connected through first bus 618 and second bus 620.

The most remote, highest latency, but nevertheless useful communication pathway would be via shared storage 622 supporting connections from both first I/O device interface 614 and second I/O device interface 616. Technology exists whereby the same storage device can support the I/O interface of differing system architectures protocols, thereby allowing the first data processing system 500-1 to access the storage data of the second data processing system 500-2 and vice-versa.

A less remote, lower latency communication pathway would be via network 624, supporting connections from both first network interface 610 and second network interface 612. Some network protocols such as TCP/IP allow the exchange of message packets of information between systems. Other protocols such as Infiniband support VIA (Virtual Interface Architecture) which allow direct sharing of memory between first task(s) 502 and second task(s) 504, using RDMA (Remote Direct Memory Access) via network 624 to permit the first data processing system 500-1 to access second memory 608 and the second data-processing system 500-2 to access first memory 606.

The least remote, lowest latency communication pathway involves the actual sharing of memory between the first and second data processing systems 500, as illustrated by the shared memory overlap 626 between first memory 606 and second memory 608. This type of memory sharing requires that the first and second data processing systems 500 be logical or physical partitions within the same physical data processing system. The same communication protocols as used in network 624 can be used at memory speed via shared memory 626, including TCP/IP and Infiniband. The latter protocol may be particularly well-suited to the needs of the present invention, because it allows the offload task 506 and the proxy task 508 to interoperate as if they were indeed coroutines executing out of the same memory on the same physical data processing system, thus approaching the efficiency of the prior-art special-purpose offload mechanisms.

Technology exists and is now emerging which allows first firmware 514 and second firmware 512 of differing architectures (e.g. PCMware of Platform Solutions, Inc.) as well as first processor(s) 602 and second processor(s) 604 of differing architectures (e.g. Common System Interface of Intel Corporation) to coexist within the same physical, partitionable data processing system. Such a hybrid system may provide a particularly suitable enabling platform for the present invention.

Figure 7:
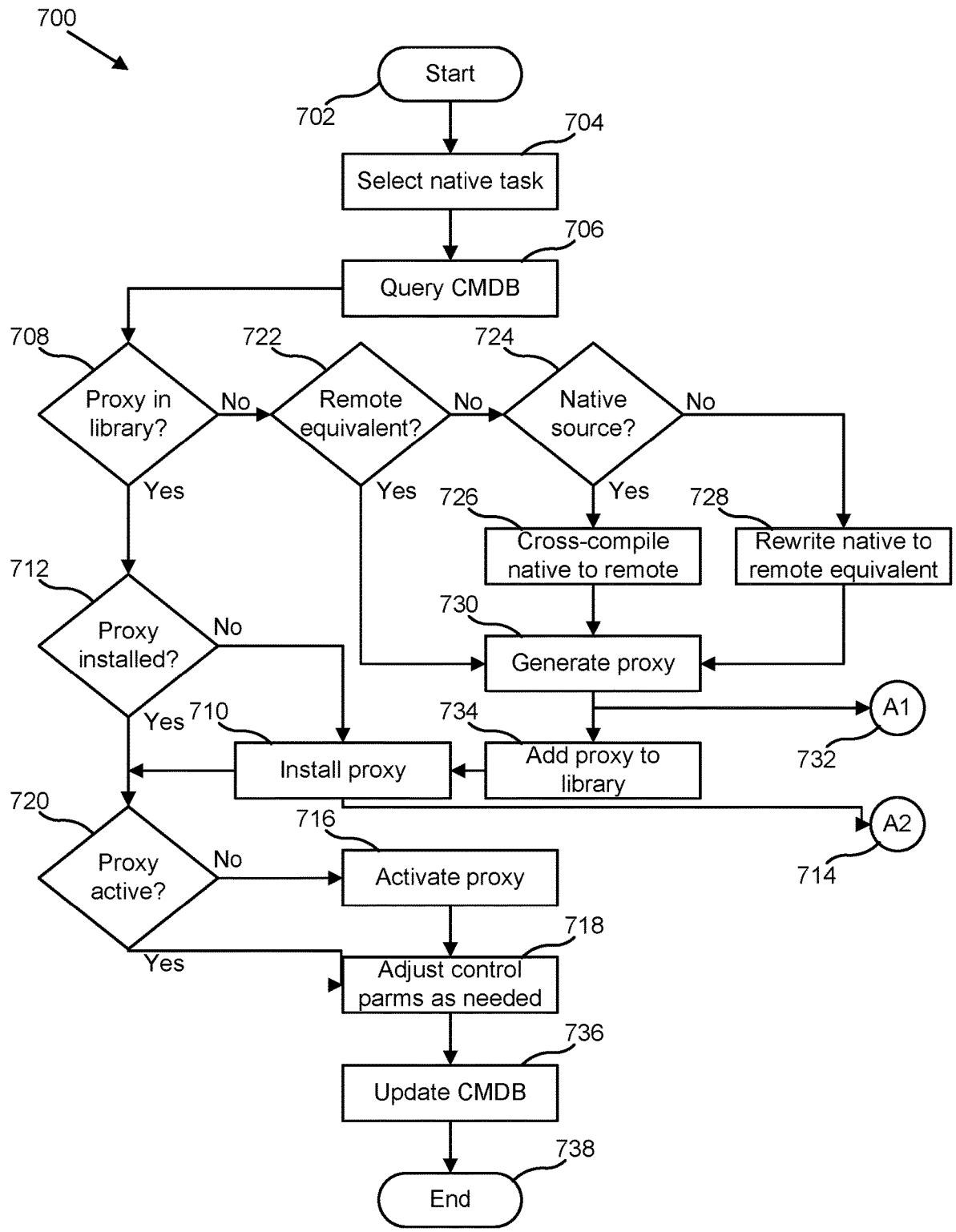
FIG. 7 is a flow diagram illustrating an embodiment of proxy configuration.

FIG. 7 is a flow diagram illustrating an embodiment of proxy configuration 700. The method starts 702 and a user may select 704 a native task to be offloaded, or the selection 704 may be implicit in some other update to the system configuration, necessitating changes with respect to an existing proxy and/or offload task. The CMDB is queried 706 to determine whether a proxy may already exist for the native task in question, and if so what may be its status with respect to the rest of the system. If a proxy already exists, it will be found in the proxy library 708. From there it can be installed 710 if needed 712 through a request transmitted 714 via node A1, activated 716 and/or reconfigured 718 as necessary 720.

If there is no corresponding proxy in the library 708, then a remote equivalent of the specified native task may be sought 722 to serve as the offload task if none already exists. If source code is available 724 for the native task, then it can be cross-compiled 726 for the remote data processing system 500-1. If a remote equivalent does not exist 722 nor can be ported, compiled, or automatically provided 726 in some manner, then the user may be prompted to do a rewrite 728 of the native task or otherwise develop a remote equivalent and supply it manually.

Once a remote equivalent has been identified 722, then a proxy for the native task can be generated 730 using a generic proxy template 1000 through a request transmitted 732 via node A1. The newly generated proxy is then added 734 to the proxy library, installed 710, and activated 716. Other control parameters may need to be initialized and/or adjusted 718 to govern the deployment and behavior of the proxy, as specified by the user or inherently necessitated by aspects of the system environment and configuration. Lastly, the CMDB may be updated 736 to reflect the amended configuration of the system, including the proxy for the native task and its associated remote equivalent task, whether newly generated or merely updated in some way, and the method 700 ends 738.

Figure 8:
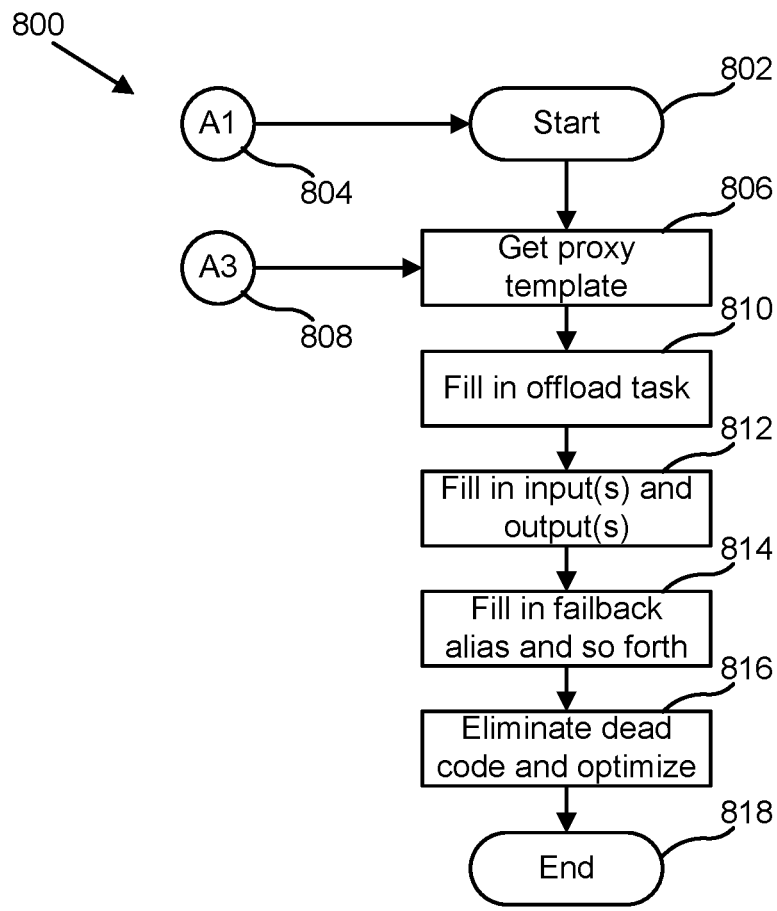
FIG. 8 is a flow diagram illustrating an embodiment of proxy generation.

FIG. 8 is a flow diagram illustrating an embodiment of proxy generation 800. The method 800 starts 802 through a request received 804 via node A1. A generic proxy template 1000 may be used 806 as received 808 via node A3, having predetermined blank fields for specific information related to the native task to be offloaded. Such fields may include specification of the remote equivalent offload task 810, specification of input and output parameters and/or data 812 needed by the task, an alias of the native task to be invoked for purposes of automatic failback 814 in the event of an error, and so forth.

In one embodiment, the proxy generation may be performed manually, either from scratch or by filling in a proxy template by hand. In another embodiment, proxy generation may be fully automated. In a further embodiment, a basic proxy may be generated automatically, and then customized and optimized by hand if desired.

Further performance optimization 816 may also be automatically performed. For example, if a given native task has implicit input or output that does not need to be specified, the related portion(s) of the proxy template may be automatically removed from the proxy as generated. Other strategies such as might be employed by the back end of an optimizing compiler may also be used in proxy generation, and the method 800 ends 818.

Figure 9:
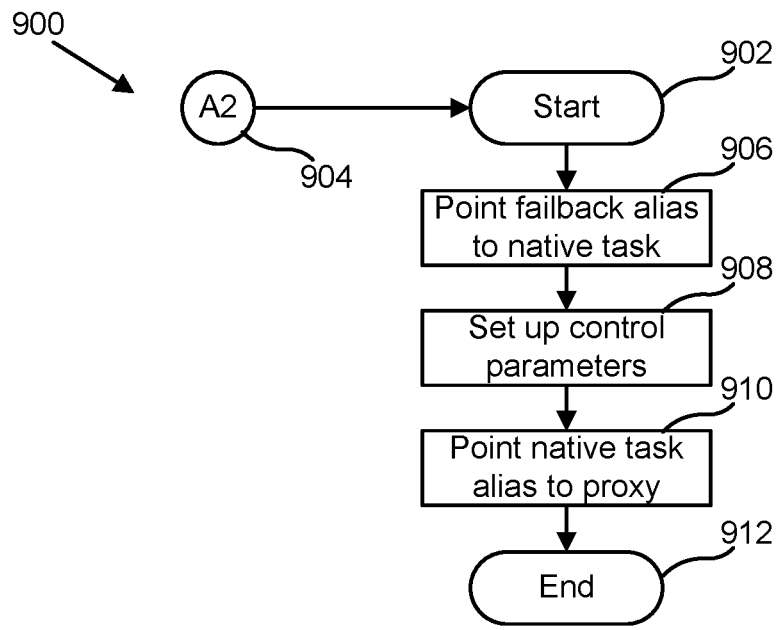
FIG. 9 is a flow diagram illustrating an embodiment of proxy installation, after a proxy has been generated or retrieved from the proxy library.

FIG. 9 is a flow diagram illustrating an embodiment of proxy installation 900, after a proxy has been generated 730 or retrieved from the proxy library 708. The method 900 starts 902 through a request received 904 via node A2. In preparation for the eventuality of an offload error condition, the failback alias may be pointed 906 to the native task. This alias is used to invoke the native task directly in the event of an error in the offloading process. Without that, an offload error might cause an indefinite loop as the proxy essentially re-invokes itself repeatedly, unsuccessfully trying to offload the native task again and again. The failback alias could also be used to deliberately bypass the proxy when offloading of the native task is not desired in a specific instance, without having to disable the proxy altogether.

Any control parameters that are needed would then be set 908 as appropriate. For example, such parameters may include connectivity information between the native and the remote data processing system 500-1, such as Domain Name Server ("DNS") names or Internet Protocol ("IP") addresses. Parameters may include filters that enable or disable offloading when specific criteria are met, such as matching all or part of a job name with one or more character patterns. Parameters may include enablement and disablement of specific data transport mechanisms, such as File Transfer Protocol ("FTP"), Parallel Data Mover ("PDM"), and so forth. A parameter to enable or disable offloading of the native task altogether may be provided. In one embodiment, a z/OS® parameter library ("parmlib") dataset may be provided with members containing the control parameters for each proxy. In a further embodiment, a "dashboard" or other integrated user interface may be provided to inspect and set the various parameters.

Finally, an alias of the native task may be pointed 910 to the proxy, so as to transparently invoke the offload task in lieu of the native task. Other similar methods may also be employed, such as user-specified exits to modify task invocation on the fly. To uninstall a proxy, the foregoing steps may simply be undone in reverse order 910, 908 and 906, and the method 900 ends 912.

Figure 10:
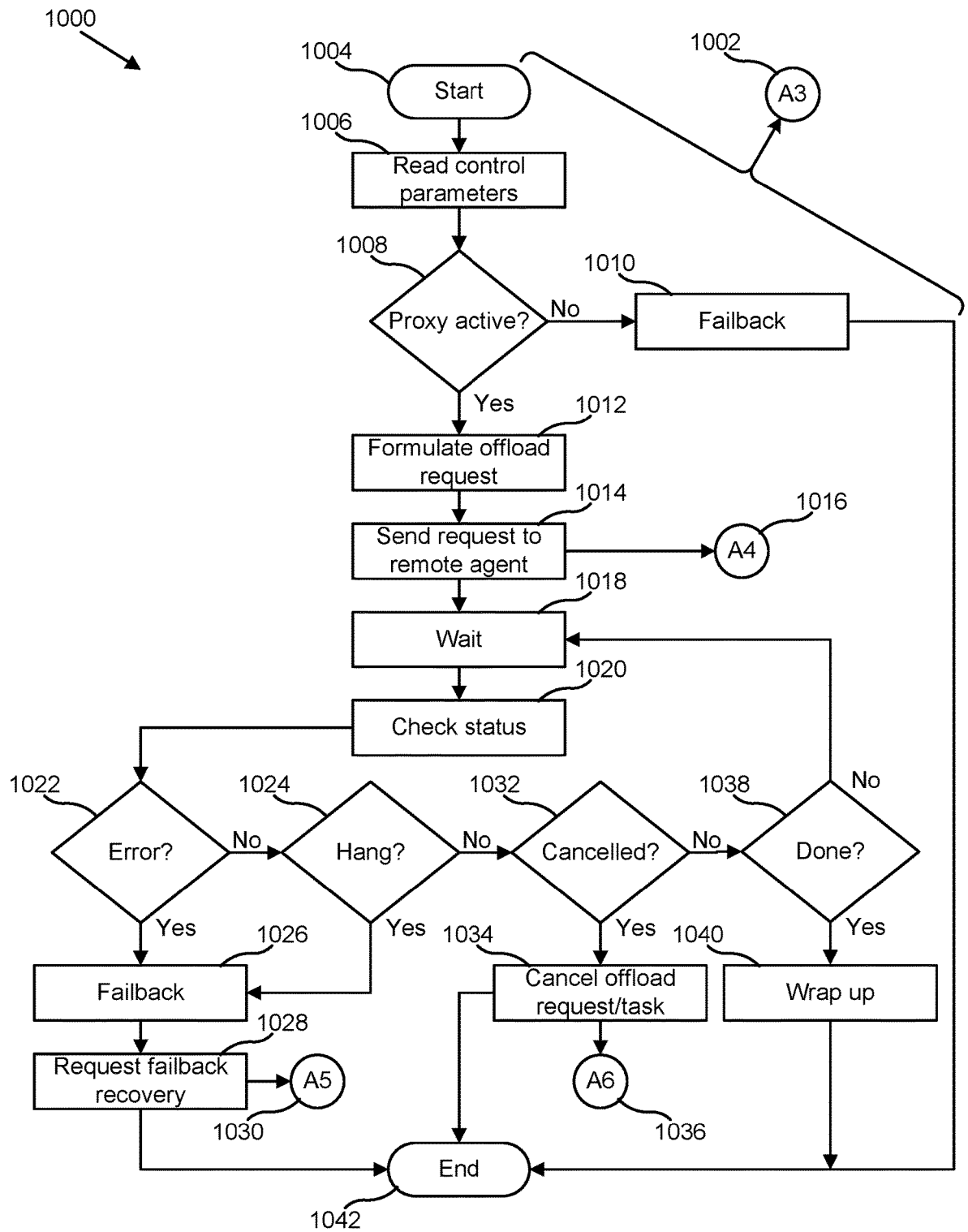
FIG. 10 is a flow diagram illustrating an embodiment of a proxy template.

FIG. 10 is a flow diagram illustrating an embodiment of a proxy template 1000 which may be transmitted 1002 via node A3. The method 1000 starts 1004 and control parameters may be read 1006 from a parmlib or other source. If the proxy is not active or enabled 1008, then the entire offload process is bypassed 1010, invoking the native task through the failback alias. No failback recovery is requested in this case, because deactivation or disablement of the proxy is not an error in and of itself, although it may or may not have resulted from an earlier error of some kind.

If the proxy is active 1008, then the offload is performed. An offload request may be composed 1012, comprising the fields that were filled in by proxy generation 800, such as the remote equivalent offload task 810, input and/or output parameters and/or data 812, and so forth. The offload request may then be sent 1014 to the remote offload agent as transmitted 1016 via node A4. In one embodiment, the proxy may poll 1018 the status of the remote offload request in a polling wait loop. In another embodiment, it may wait 1018 for an explicit response via an interrupt from the offload agent. In a further embodiment, a combination 1018 of polling and interruption may be utilized.

After waiting 1018, the proxy checks 1020 the status of the offload request. If any error occurs 1022 or persistent hang condition exists 1024 that prevents successful completion of the offload request, the native task is invoked 1026 through the failback process, and failback recovery is requested 1028 as transmitted 1030 via node A5. In one embodiment, the hang condition 1024 may be detected by lack of visible forward progress by the offload agent after one or more polling intervals 1018, such as might be indicated by a timestamp that fails to advance as part of a "heartbeat" check.

If the native data processing system 500-2 cancels 1032 the native task that is being offloaded by the proxy, then the proxy in turn must cancel 1034 the remote equivalent task through a request as transmitted 1036 via node A6. If the status indicates that the remote equivalent task has successfully completed 1038, then any necessary wrap-up actions may be performed 1040, and the proxy method 1000 completes 1042. Wrap-up actions 1040 may include deallocating resources, reporting status to the native data processing system 500-2, and so forth. If none of the foregoing conditions exist, then the proxy resumes waiting 1018.

The foregoing description includes the basic elements of a simple proxy. In a further embodiment, other conditional elements may be provided in the template 1000 to support more advanced tasks, to be eliminated in simpler cases that do not require those elements. For example, a more advanced native task may comprise a major subsystem that needs to be initially launched or otherwise activated, then service real-time requests from other tasks and/or users, and finally be shut down or otherwise deactivated when no longer needed. In one embodiment, the native subsystem may be offloaded by in a single complex proxy. In another embodiment, it may be decomposed into multiple simpler proxies.

In general, it may be desirable to keep the proxy template module 202 as simple as possible, so as to minimize the native CPU time, inasmuch as offloading the native data processing system 500-2 is a stated objective of proxy coupling. That is also why the proxy generation module 204 may hard-code the specific information related to the native task to be offloaded by filling in predetermined blank fields in the proxy template, as opposed to having the proxy 508 incur the overhead of determining that information in real time. The performance optimizations performed by the proxy generation module 204 as described above may also help to serve the same purpose, namely, to further minimize native CPU time.

FIG. 11 is a flow diagram illustrating an embodiment of an offload agent 1100. See FIG. 11A. The method 1100A starts 1102A through a request as transmitted 1104A via node A10. While idle, the offload agent simply waits 1106A for new offload request(s) 1108A as received 1110A via node A4 from one or more proxies. As with the proxy, the offload agent may utilize polling and/or interruption. If the proxy and the offload agent both use polling, then any difference in polling frequency may be factored into hang detection as part of a heartbeat check, such as waiting for more than one polling interval to ascertain forward progress. Queues may be provided for the offload agent to track the progress of remote equivalent offload tasks, including a pending queue of offload requests that have been received and an active queue of offload tasks that are in progress.

When a new offload request is received, then it may be added 1112A to the pending queue. If one or more offload requests are cancelled 1114A through a request received 1116A via node A6, then any corresponding offload tasks may be terminated 1118A and the corresponding offload requests may be removed 1120A from the pending queue and the active queue. The method 1100A ends 1022A and proceeds 1124A to the method 1100B via node A7.

Figure 11A:
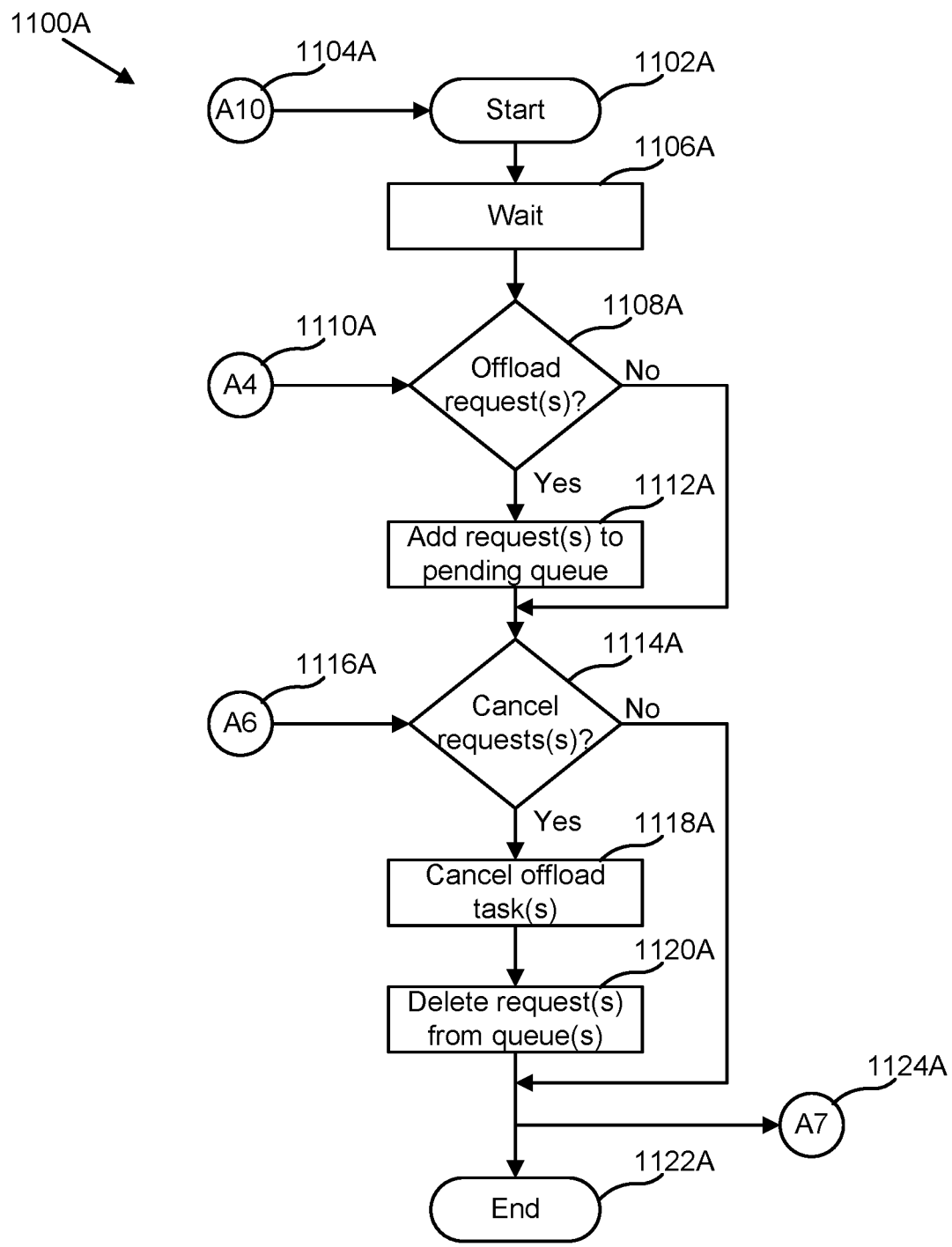
FIGS. 11A-11D are flow diagrams illustrating an embodiment of an offload agent.
Figure 11B:
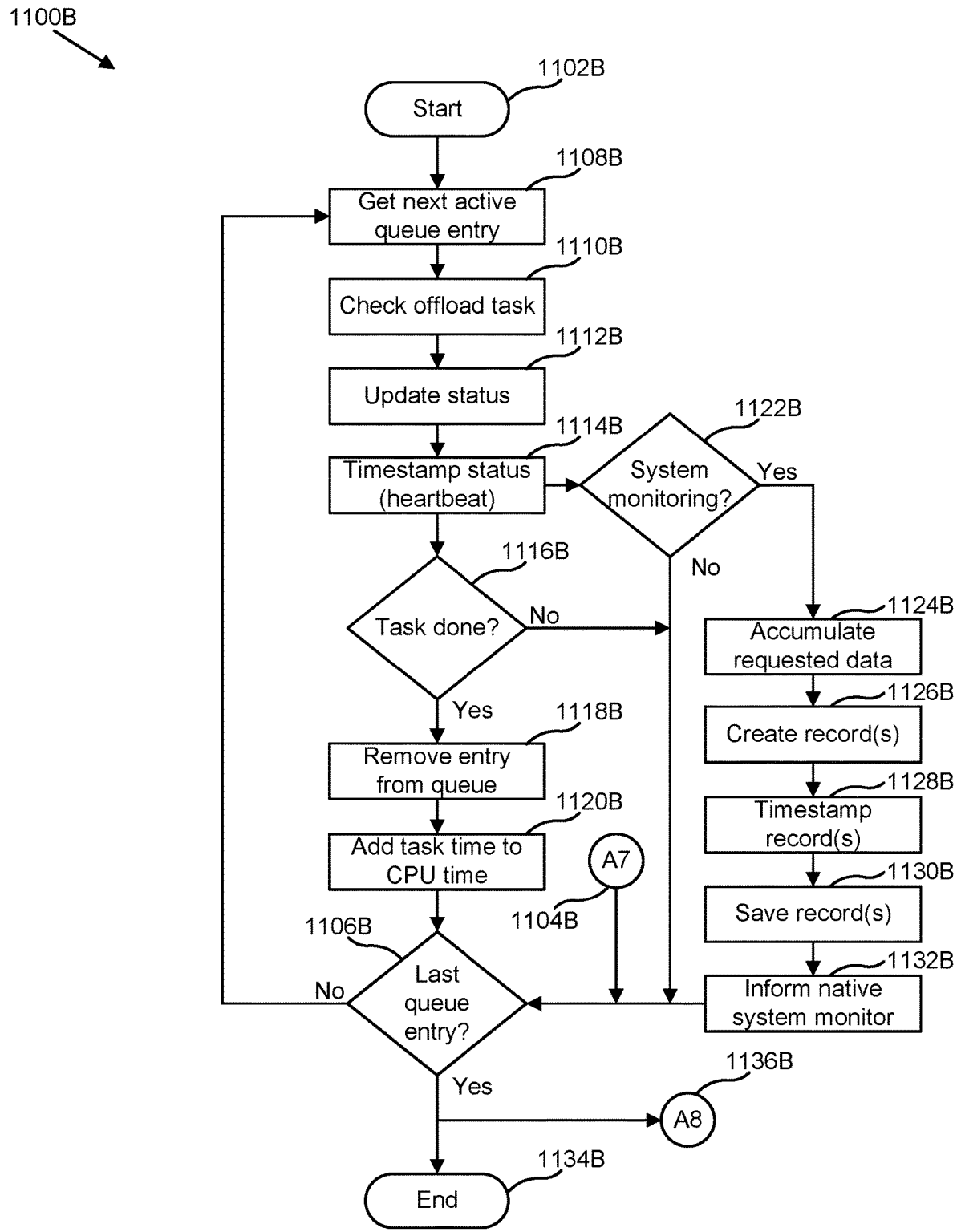

See FIG. 11B. The method 1100B starts 1102B through a request as received 1104B via node A7. If the active queue is not empty 1106B, then it may be processed 1108B one consecutive entry at a time. The offload task associated with the next entry may be checked 1110B, and its status updated 1112B accordingly, to be reported to the corresponding proxy. A timestamp may also be included 1114B in the status as part of the above-described heartbeat hang-detection mechanism.

If the task is finished 1116B, then the corresponding entry may be removed 1118B from the active queue. The CPU (Central Processing Unit) time expended for the task may be added 1120B to a total CPU time, to keep track of how much CPU time is being spent on offload tasks. This timing information may be needed for usage-based licensing of the proxy coupling offload facility.

In a further embodiment, if system monitoring is requested 1122B, then the requested measurement data may be accumulated 1124B, and one or more records created 1126B to hold the data. A timestamp may also be included 1128B in the record(s). The record(s) may then be saved 1130B and the native data processing system monitor informed 1132B that the requested data is available for inspection. The method 1100B ends 1134B and proceeds 1136B to the method 1100C via node A8.

Figure 11C:
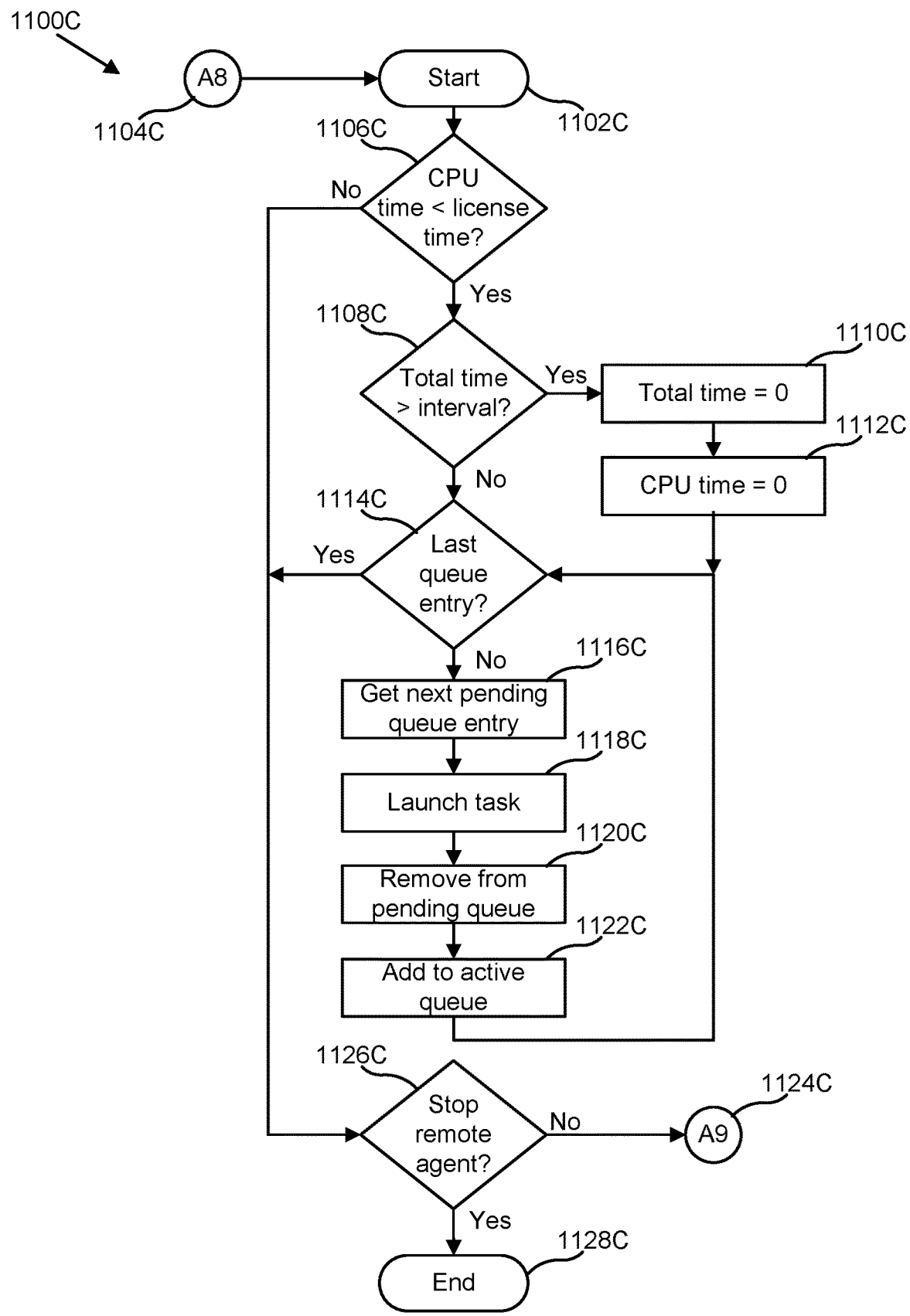

See FIG. 11C. The method 1100C starts 1102C through a request as received 1104C via node A8. As already noted, licensing of the proxy coupling facility may be usage-based. In one embodiment, the license may be for a specified number Millions of Instructions Per Second ("MIPS"). The remote offload system may have a total MIPS capacity, of which the licensed number of MIPS is a fraction that can be computed by dividing it into the total MIPS. Usage may then be computed across regular measurement intervals.

If the total CPU time as calculated above is less than the total time that has elapsed during the current measurement interval, times the licensed fraction of total MIPS capacity, then additional offload capacity is still available 1106C.

Once the total time elapsed reaches the amount of the specified measurement interval 1108C, then the total time 1110C and the total CPU time 1112C may be reset to zero, thus initiating the next measurement interval. The longer the measurement interval, the more any unused offload capacity may be "banked" for future usage. It may be advisable to make the measurement interval long enough for a certain amount of banking to handle spikes in offload demand, but short enough to evenly ration the licensed capacity over time in a steady, predictable manner. Embodiments may include a measurement interval of an hour, four hours, eight hours, twenty-four hours, or the like.

If additional offload capacity is available 1108C, and the pending queue is not empty 1114C, then it may be processed 1116C one consecutive entry at a time. The offload task associated with the next entry may be launched 1118C or otherwise activated, removed 1120C from the pending queue, and added 1122C to the active queue. If additional capacity is not available 1106C, or all the pending offload tasks have been launched 1118C and the pending queue is now empty 1114C, then the remote offload agent continues operation 1124C via node A9 unless it is stopped 1126C in which case the method 1100C ends 1128C.

Figure 11D:
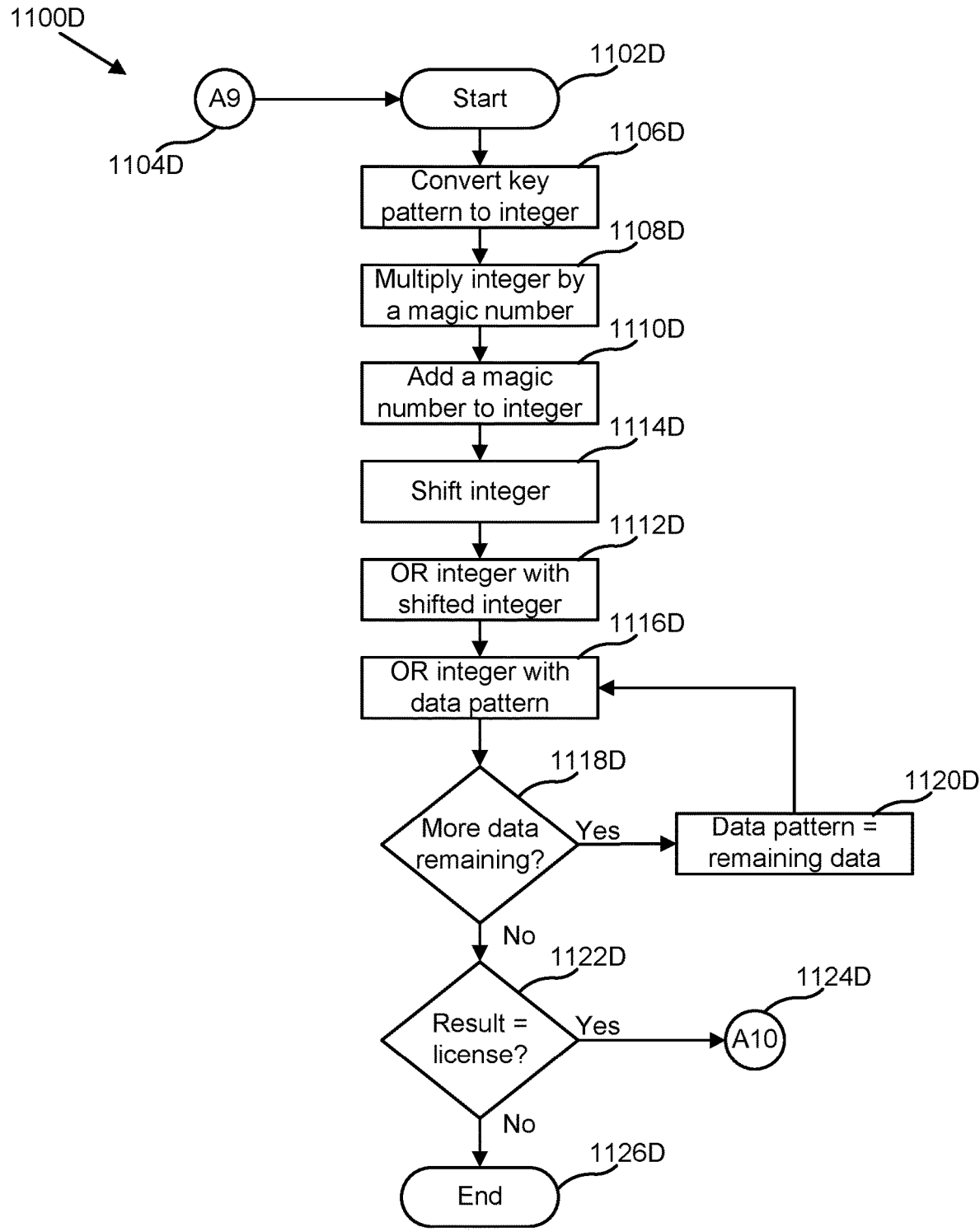

See FIG. 11D. The method 1100D starts 1102D through a request as received 1104D via node A9. In an embodiment, the remote offload agent may check the validity of a license key while entering the idle state or at any other appropriate juncture. A key pattern and a data pattern may be used as input to a capacity security algorithm to initially generate the license key based on known valid information, and then perform the aforementioned validity check by regenerating the key based on current information, and matching it against the key as initially generated.

The key pattern may be a value that is unique to a licensed system environment, such as an IP address of an Ethernet interface. The data pattern may be a character string comprising a start date (DDMMYYYY) from when the license is to take effect, a start day of the year (NNN), a current day of the year (NNN), a number of days (NNN), a licensed capacity count (NN), and so forth. In one embodiment, the licensed capacity count may be a percentage of total MIPS capacity, which may also correspond to a percentage of elapsed time comprising CPU time consumed by offload processing during a measurement interval, as described previously.

The key pattern may be converted 1106D to an integer in such a way that both arithmetic and logical operations may be performed upon it. In an embodiment, the integer may be binary. In a further embodiment, the base of the integer may be a higher power of two, such as a four-bit nibble comprising a hexadecimal digit.

Numeric string constants, also referred to as "magic" numbers, may be predetermined and used to operate upon the integer. The integer may be multiplied 1108D by a first magic number. In an embodiment, the multiplication 1108D may be performed on one or more digits at a time, including bits, nibbles, bytes, and so forth. A second magic number, which may or may not be the same as the first magic number, may be added 1110D to the integer. The integer may also be ORed 1112D with a shifted 1114D version of itself. For example, it may be shifted left by one or more places, including a bit, nibble, byte, and so forth.

The integer may also be ORed 1116D with the data pattern. If the data pattern is longer than the integer, such that there is more data remaining 1118D, then the remaining portion 1120D may be ORed 1116D with the result of the previous ORing 1116D until the data is exhausted 1118D. In one embodiment, the integer resulting from the operations upon the key pattern may be ORed with the data pattern in a piecemeal fashion. In a further embodiment, it may be ORed 1116D from left to right one bit, nibble, or byte at a time. For example, the first byte of the resulting key pattern may be ORed 1116D with the first byte of the data pattern, the second byte of the key pattern may then be ORed 1116D with the second byte of the data pattern, and so forth. When the key pattern is exhausted and there is still 1118D data in the data pattern then the key pattern may be reset to the first byte and the data pattern ORing 1116D may resume. This may continue until the data pattern is exhausted 1118D.

The types of arithmetic and logical operations performed, and the sequence in which they are performed, are not limited to those in the foregoing description. Once the processing of the key pattern and the data pattern is complete, then the resulting key value is compared 1122D with the initially generated key value. If they match, then operation of the remote offload agent continues and may return 1124D to the idle state via node A10 and wait 1106A for some more time to pass. If they do not match 1122D, then operation is suspended and the method 1100D ends 1126D. Other modules may also be directly or indirectly affected by suspension of operation. For example, suspension of the remote offload agent may cause the proxy to detect a hang, which in turn may cause failback recovery to be requested.

Figure 12:
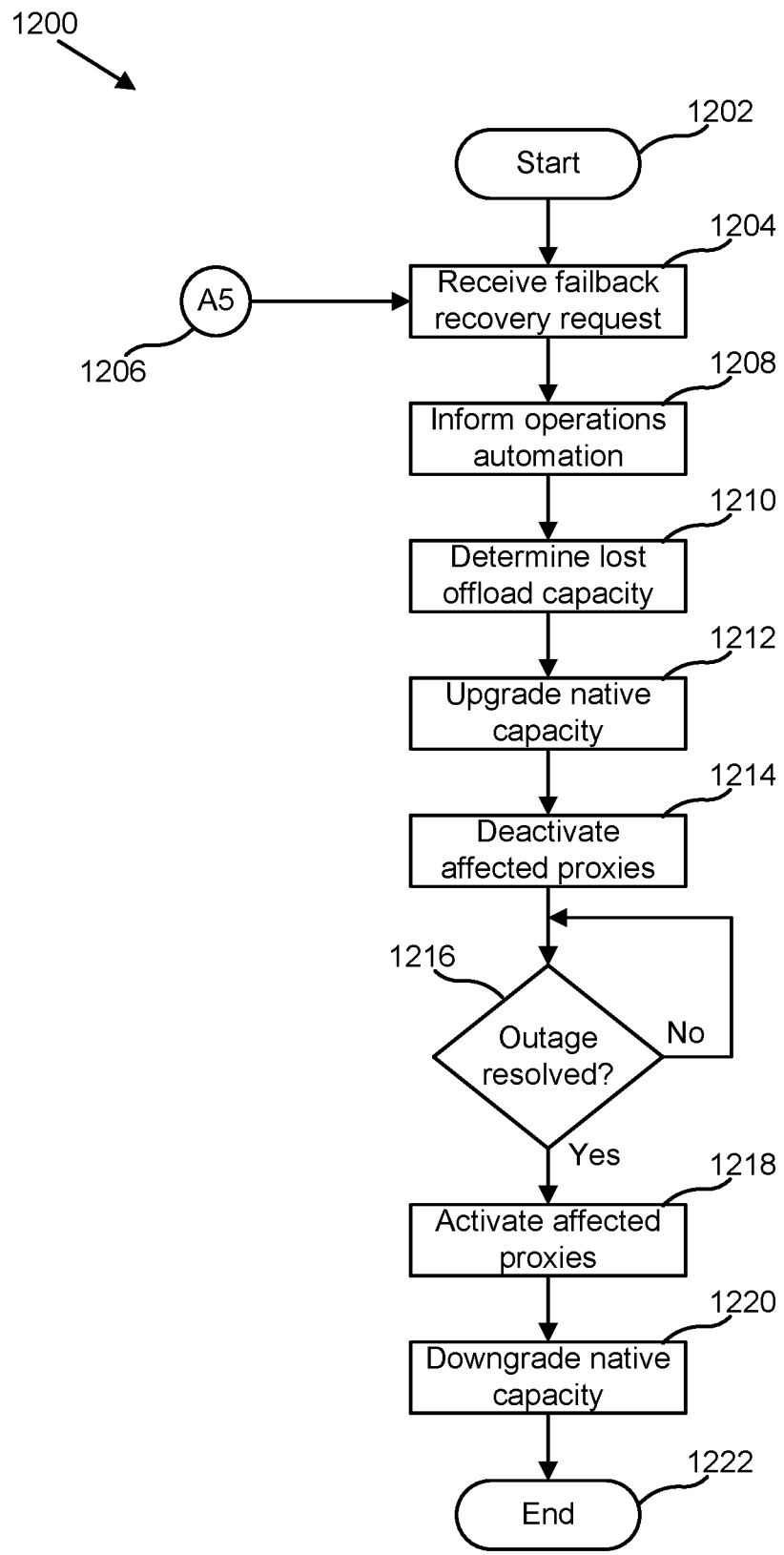
FIG. 12 is a flow diagram illustrating an embodiment of failback recovery.

FIG. 12 is a flow diagram illustrating an embodiment of failback recovery 1200. The method 1200 starts 1202 and if failback recovery is requested 1204 as received 1206 via node A5, then the native operations automation facility may be informed 1208. A determination may be made 1210 of the amount of offload capacity that has been lost. Native capacity may be dynamically upgraded 1212 to temporarily make up for the lost offload capacity. In an embodiment, the Capacity Upgrade on Demand ("CUoD") facility may be utilized. Any affected proxies may then be deactivated 1214. In one embodiment, proxy-specific activation control parameters may be disabled. In another embodiment, a system-wide proxy coupling activation parameter may be disabled.

When the outage has been resolved 1216, the affected proxies may be re-activated 1218, allowing offloading to resume. The native capacity that was temporarily upgraded may be dynamically downgraded 1220, restoring normal proxy coupling operations, and the method 1200 ends 1222.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a proxy template module that is configured to transparently offload a task from a native data processing system to an equivalent task on a remote data processing system;
  a proxy generation module that fills in the proxy template with information for a selected native task so as to generate a proxy of the native task, wherein the proxy is thereby provided with an external interface substantially identical to that of the native task, so as to act in lieu of the native task on the native data processing system, and the information comprises a specification of an offload task that is a functional equivalent of the native task; and
  an offload agent module that receives a request from the proxy to perform the internal functionality of the native task by delegating it to the offload task on the remote data processing system via
    mapping the request into a corresponding form that is intelligible to the remote data processing system and communicating it to the offload task,
    performing the internal functionality of the native task by interchanging it with the substantially equivalent internal functionality of the offload task in a seamlessly transparent and automatic manner, and
    reporting completion of the internal functionality to the proxy
  wherein the proxy template module, the proxy generation module, and the offload agent module comprise one or more of logic hardware and executable code, the executable code stored on one or more non-transitory computer-readable media.

2. The apparatus of claim 1, wherein the proxy template module is configured to monitor the offload agent, cancel the request to the offload agent, and initiate a failback to revert to the native task.

3. The apparatus of claim 1, wherein the information filled in by the proxy generation module further comprises specification of input and output data needed by the native task.

4. The apparatus of claim 1, wherein the information filled in by the proxy generation module further comprises specification of an alias of the native task to be invoked for purposes of automatic failback in the event of an error.

5. The apparatus of claim 1, wherein the offload agent module enqueues an offload request from the proxy to a pending queue.

6. The apparatus of claim 1, wherein the offload agent module moves the request from a pending queue to an active queue and activates the corresponding offload task.

7. The apparatus of claim 1, wherein the offload agent module monitors the offload task on an active queue and dequeues the offload task upon completion.

8. The apparatus of claim 1, further comprising a proxy configuration module that incorporates the proxy and its corresponding offload task into a configuration management database.

9. The apparatus of claim 8, wherein the proxy configuration module enhances security and access control for proxy code and data.

10. The apparatus of claim 8, wherein the proxy configuration module adjusts control parameters of the proxy and initially activates the proxy.

11. The apparatus of claim 1, further comprising a proxy installation module that installs the generated proxy on the native data processing system.

12. The apparatus of claim 11, wherein the proxy installation module creates control parameters for the proxy.

13. The apparatus of claim 11, wherein the proxy installation module associates a native task alias with the proxy.

14. The apparatus of claim 1, further comprising a failback recovery module that reverts back to the native task if the proxy, offload agent module, or remote data processing system experiences an outage.

15. The apparatus of claim 14, wherein the failback recovery module adjusts native data processing system capacity, deactivates any affected proxy, and restores normal proxy coupling operation when the outage has been resolved.

16. A system comprising:
   a remote data processing system comprised of a first operating system, a first firmware, and a first hardware platform;
   a native data processing system comprised of a second operating system, a second firmware, and a second hardware platform;
   a communication mechanism between the remote data processing system and the native data processing system;
   a proxy template module that is configured to transparently offload a task from the native data processing system to an equivalent task on the remote data processing system;
   a proxy generation module that fills in the proxy template with information for a selected native task so as to create a proxy of the native task, wherein the proxy is thereby provided with an external interface substantially identical to that of the native task, so as to act in lieu of the native task on the native data processing system, and the information comprises a specification of an offload task that is a functional equivalent of the native task;
   an offload agent module that receives a request from the proxy to perform the internal functionality of the native task by delegating it to the offload task on the remote data processing system via
      mapping the request into a corresponding form that is intelligible to the remote data processing system and communicating it to the offload task,
      performing the internal functionality of the native task by interchanging it with the substantially equivalent internal functionality of the offload task in a seamlessly transparent and automatic manner, and
      reporting completion of the internal functionality to the proxy
   wherein the proxy template module, the proxy generation module, and the offload agent module comprise one or more of logic hardware and executable code, the executable code stored on one or more non-transitory computer-readable media; and
   a storage system to store input and output data.

17. The system of claim 16, further comprising a failback recovery module that informs an operations automation module when a failback occurs.

18. The system of claim 16, wherein the offload agent module informs a system monitoring module of requested measurement data.

19. A computer program product comprising a non-transitory computer readable medium having computer usable program code executable to perform operations for offloading data processing, the operations of the computer program product comprising:
   providing a proxy template that is configured to transparently offload a task from a native data processing system to an equivalent task on a remote data processing system;
   filling in the proxy template with information for a selected native task so as to create a proxy of the native task, wherein the proxy is thereby provided with an external interface substantially identical to that of the native task, so as to act in lieu of the native task on the native data processing system, and the information comprises a specification of an offload task that is a functional equivalent of the native task;
   receiving a request from the proxy to perform the internal functionality of the native task by delegating it to the offload task on the remote data processing system;
   mapping the request into a corresponding form that is intelligible to the remote data processing system and communicating it to the offload task;
   performing the internal functionality of the native task by interchanging it with the substantially equivalent internal functionality of the offload task in a seamlessly transparent and automatic manner; and
   reporting completion of the internal functionality to the proxy.

20. A machine-implemented method for offloading data processing, the method comprising the steps of:
   providing a proxy template that is configured to transparently offload a task from a native data processing system to an equivalent task on a remote data processing system;
   filling in the proxy template with information for a selected native task so as to create a proxy of the native task, wherein the proxy is thereby provided with an external interface substantially identical to that of the native task, so as to act in lieu of the native task on the native data processing system, and the information comprises a specification of an offload task that is a functional equivalent of the native task;
   receiving a request from the proxy to perform the internal functionality of the native task by delegating it to the offload task on the remote data processing system;
   mapping the request into a corresponding form that is intelligible to the remote data processing system and communicating it to the offload task;
   performing the internal functionality of the native task by interchanging it with the substantially equivalent internal functionality of the offload task in a seamlessly transparent and automatic manner; and
   reporting completion of the internal functionality to the proxy.

* * * * *